US009718691B2

(12) United States Patent
Johnson et al.

(10) Patent No.: US 9,718,691 B2
(45) Date of Patent: Aug. 1, 2017

(54) EXFOLIATING-DISPERSING AGENTS FOR NANOTUBES, BUNDLES AND FIBERS

(71) Applicant: Nanocomp Technologies, Inc., Merrimack, NH (US)

(72) Inventors: Joseph E. Johnson, Hollis, NH (US); Mark A. Banash, Bedford, NH (US); Paul R. Jarosz, Merrimack, NH (US)

(73) Assignee: Nanocomp Technologies, Inc., Merrimack, NH (US)

( * ) Notice: Subject to any disclaimer, the term of this patent is extended or adjusted under 35 U.S.C. 154(b) by 24 days.

(21) Appl. No.: 14/244,177

(22) Filed: Apr. 3, 2014

(65) Prior Publication Data

US 2014/0366773 A1 Dec. 18, 2014

Related U.S. Application Data

(60) Provisional application No. 61/835,994, filed on Jun. 17, 2013.

(51) Int. Cl.

| | |
|---|---|
| *C09D 1/00* | (2006.01) |
| *C09D 4/00* | (2006.01) |
| *C09D 5/00* | (2006.01) |
| *C09D 11/00* | (2014.01) |
| *C09K 3/00* | (2006.01) |
| *C09D 13/00* | (2006.01) |
| *C01B 31/02* | (2006.01) |
| *C08K 3/22* | (2006.01) |

(52) U.S. Cl.
CPC ............ *C01B 31/0273* (2013.01); *C08K 3/22* (2013.01); *C01B 2202/34* (2013.01); *C01P 2004/03* (2013.01); *C01P 2004/13* (2013.01)

(58) Field of Classification Search
USPC .................. 106/31.13, 31.01, 31.27
See application file for complete search history.

(56) References Cited

U.S. PATENT DOCUMENTS

| | | | |
|---|---|---|---|
| 2,962,386 | A | 11/1960 | Doll et al. |
| 3,090,876 | A | 5/1963 | Hutson |
| 3,109,712 | A | 11/1963 | Redfern |
| 2,462,289 | A | 8/1969 | Rolh et al. |
| 3,462,289 | A | 8/1969 | Rolh et al. |
| 3,693,851 | A | 9/1972 | Yazawa |
| 3,706,193 | A | 12/1972 | Amato |

(Continued)

FOREIGN PATENT DOCUMENTS

| | | |
|---|---|---|
| CN | 1614772 | 5/2005 |
| DE | 102006014171 | 9/2007 |

(Continued)

OTHER PUBLICATIONS

"Metallurgical & Chemical Engineering", McGraw Publishing Co., vol. 15, No. 5, pp. 258-259, Dec. 15, 1916.

(Continued)

*Primary Examiner* — James McDonough
(74) *Attorney, Agent, or Firm* — Greenberg Traurig, LLP; Chinh H. Pham; Natalie Salem

(57) ABSTRACT

Methods and compositions for the formation of dispersions of nanotubes are provided using solution comprising an aromatic hydrocarbon and an electron donor group. Also provided are methods for isolating carbon nanotubes from the composition, and use of carbon nanotube products.

8 Claims, 4 Drawing Sheets

(56) References Cited

U.S. PATENT DOCUMENTS

| | | | |
|---|---|---|---|
| 3,895,041 A * | 7/1975 | Inman | C08K 5/0091 106/419 |
| 3,943,689 A | 3/1976 | Kunz et al. | |
| 3,983,202 A | 9/1976 | Skoroszewski | |
| 4,384,944 A | 5/1983 | Silver et al. | |
| 4,468,922 A | 9/1984 | McCrady et al. | |
| 4,572,813 A | 2/1986 | Arakawa | |
| 4,987,274 A | 1/1991 | Miller et al. | |
| 5,168,004 A | 12/1992 | Daumit et al. | |
| 5,428,884 A | 7/1995 | Tsuzuki | |
| 5,488,752 A | 2/1996 | Randolph | |
| 5,648,027 A | 7/1997 | Tajiri et al. | |
| 5,747,161 A | 5/1998 | Iijima | |
| 5,874,159 A | 2/1999 | Cruise et al. | |
| 6,036,774 A | 3/2000 | Lieber et al. | |
| 6,043,648 A | 3/2000 | Menke et al. | |
| 6,110,590 A | 8/2000 | Zarkoob et al. | |
| 6,143,412 A | 11/2000 | Schueller et al. | |
| 6,265,466 B1 | 7/2001 | Glatkowski et al. | |
| 6,299,812 B1 | 10/2001 | Newman et al. | |
| 6,308,509 B1 | 10/2001 | Scardino et al. | |
| 6,331,265 B1 | 12/2001 | Dupire et al. | |
| 6,333,016 B1 | 12/2001 | Resasco et al. | |
| 6,376,971 B1 | 4/2002 | Pelrine et al. | |
| 6,426,134 B1 | 7/2002 | Lavin et al. | |
| 6,452,085 B2 | 9/2002 | Tauchi et al. | |
| 6,495,116 B1 | 12/2002 | Herman | |
| 6,541,744 B2 | 4/2003 | Von Arx et al. | |
| 6,611,039 B2 | 8/2003 | Anthony et al. | |
| 6,630,772 B1 | 10/2003 | Bower et al. | |
| 6,682,677 B2 | 1/2004 | Lobovsky et al. | |
| 6,703,104 B1 | 3/2004 | Neal | |
| 6,706,402 B2 | 3/2004 | Rueckes et al. | |
| 6,713,034 B2 | 3/2004 | Nakamura et al. | |
| 6,723,299 B1 | 4/2004 | Chen et al. | |
| 6,764,628 B2 | 7/2004 | Lobovsky et al. | |
| 6,764,874 B1 | 7/2004 | Zhang et al. | |
| 6,790,426 B1 | 9/2004 | Ohsaki | |
| 6,841,139 B2 | 1/2005 | Margrave et al. | |
| 6,842,328 B2 | 1/2005 | Schott et al. | |
| 6,854,602 B2 | 2/2005 | Oyama et al. | |
| 6,884,861 B2 | 4/2005 | Keller et al. | |
| 6,908,572 B1 | 6/2005 | Derbyshire et al. | |
| 6,923,946 B2 | 8/2005 | Geohegan et al. | |
| 6,955,937 B1 | 10/2005 | Burke et al. | |
| 6,979,709 B2 | 12/2005 | Smalley et al. | |
| 7,001,556 B1 | 2/2006 | Shambaugh | |
| 7,041,620 B2 | 5/2006 | Smalley et al. | |
| 7,045,108 B2 | 5/2006 | Jiang et al. | |
| 7,048,999 B2 | 5/2006 | Smalley et al. | |
| 7,052,668 B2 | 5/2006 | Smalley et al. | |
| 7,109,581 B2 | 9/2006 | Dangelo | |
| 7,122,165 B2 | 10/2006 | Wong et al. | |
| 7,182,929 B1 | 2/2007 | Singhal et al. | |
| 7,192,642 B2 | 3/2007 | Veedu et al. | |
| 7,205,069 B2 | 4/2007 | Smalley et al. | |
| 7,247,290 B2 | 7/2007 | Lobovsky et al. | |
| 7,288,238 B2 | 10/2007 | Smalley et al. | |
| 7,323,157 B2 | 1/2008 | Kinloch et al. | |
| 7,384,520 B2 | 6/2008 | Iijima et al. | |
| 7,413,474 B2 | 8/2008 | Liu et al. | |
| 7,437,938 B2 | 10/2008 | Chakraborty | |
| 7,491,883 B2 | 2/2009 | Lee et al. | |
| 7,553,472 B2 | 6/2009 | Mouli et al. | |
| 7,611,579 B2 | 11/2009 | Lashmore et al. | |
| 7,615,097 B2 | 11/2009 | McKechnie et al. | |
| 7,615,204 B2 | 11/2009 | Ajayan et al. | |
| 7,641,829 B2 | 1/2010 | Liang et al. | |
| 7,666,911 B2 | 2/2010 | Russell et al. | |
| 7,704,480 B2 | 4/2010 | Jiang et al. | |
| 7,727,504 B2 | 6/2010 | Kittrell et al. | |
| 7,745,498 B2 | 6/2010 | Pereira et al. | |
| 7,745,810 B2 | 6/2010 | Rueckes et al. | |
| 7,750,240 B2 | 7/2010 | Jiang et al. | |
| 7,846,414 B2 | 12/2010 | Harbec et al. | |
| 7,862,766 B2 | 1/2011 | Liang et al. | |
| 7,892,677 B2 | 2/2011 | Shirane et al. | |
| 7,897,248 B2 | 3/2011 | Barrera et al. | |
| 7,906,208 B2 | 3/2011 | Poulin et al. | |
| 7,938,996 B2 | 5/2011 | Baughman et al. | |
| 8,017,272 B2 | 9/2011 | Feng et al. | |
| 8,053,113 B2 | 11/2011 | Oh et al. | |
| 8,071,906 B2 | 12/2011 | Smiljanic et al. | |
| 8,778,116 B2 | 7/2014 | Morimoto et al. | |
| 9,028,790 B2 | 5/2015 | Sato et al. | |
| 2001/0003576 A1 | 6/2001 | Klett et al. | |
| 2002/0004028 A1 | 1/2002 | Margrave et al. | |
| 2002/0040900 A1 | 4/2002 | Arx et al. | |
| 2002/0113335 A1 | 8/2002 | Lobovsky et al. | |
| 2002/0130610 A1 | 9/2002 | Gimzewski et al. | |
| 2002/0136681 A1 | 9/2002 | Smalley et al. | |
| 2002/0159943 A1 | 10/2002 | Smallet et al. | |
| 2002/0179564 A1 | 12/2002 | Geobegan et al. | |
| 2003/0036877 A1 | 2/2003 | Schietinger | |
| 2003/0104156 A1 | 6/2003 | Osada et al. | |
| 2003/0109619 A1 | 6/2003 | Keller et al. | |
| 2003/0122111 A1 | 7/2003 | Glatkowski | |
| 2003/0133865 A1 | 7/2003 | Smalley et al. | |
| 2003/0134916 A1 | 7/2003 | Hrubesh | |
| 2003/0143453 A1 | 7/2003 | Ren et al. | |
| 2003/0165648 A1 | 9/2003 | Lobovsky et al. | |
| 2003/0222015 A1 | 12/2003 | Oyama et al. | |
| 2004/0020681 A1 | 2/2004 | Hjortstam et al. | |
| 2004/0022981 A1 | 2/2004 | Hu et al. | |
| 2004/0025748 A1 * | 2/2004 | Kitamura | C09B 41/003 106/402 |
| 2004/0041154 A1 | 3/2004 | Watanabe et al. | |
| 2004/0053780 A1 | 3/2004 | Jiang et al. | |
| 2004/0081758 A1 | 4/2004 | Mauthner et al. | |
| 2004/0096389 A1 | 5/2004 | Lobovsky et al. | |
| 2004/0124772 A1 | 7/2004 | Chen | |
| 2004/0150312 A1 | 8/2004 | McElrath et al. | |
| 2004/0177451 A1 | 9/2004 | Poulin et al. | |
| 2004/0180157 A1 | 9/2004 | Ishikawa et al. | |
| 2004/0197638 A1 | 10/2004 | McElrath et al. | |
| 2004/0240144 A1 | 12/2004 | Schott et al. | |
| 2004/0265212 A1 | 12/2004 | Varadan et al. | |
| 2004/0265489 A1 | 12/2004 | Dubin | |
| 2004/0266065 A1 | 12/2004 | Zhang et al. | |
| 2005/0006801 A1 | 1/2005 | Kinloch et al. | |
| 2005/0046017 A1 | 3/2005 | Dangelo | |
| 2005/0063658 A1 | 3/2005 | Crowley | |
| 2005/0067406 A1 | 3/2005 | Rjarajan et al. | |
| 2005/0074569 A1 | 4/2005 | Lobovsky et al. | |
| 2005/0087222 A1 | 4/2005 | Muller-Werth | |
| 2005/0087726 A1 | 4/2005 | Anazawa et al. | |
| 2005/0095938 A1 | 5/2005 | Rosenberger et al. | |
| 2005/0104258 A1 | 5/2005 | Lenhoff | |
| 2005/0112051 A1 | 5/2005 | Liu et al. | |
| 2005/0170089 A1 | 8/2005 | Lashmore et al. | |
| 2005/0179594 A1 | 8/2005 | Morikawa et al. | |
| 2005/0209392 A1 | 9/2005 | Luo et al. | |
| 2005/0239948 A1 | 10/2005 | Haik et al. | |
| 2005/0269726 A1 | 12/2005 | Matabayas, Jr. | |
| 2006/0017191 A1 | 1/2006 | Liang et al. | |
| 2006/0118158 A1 | 6/2006 | Zhange et al. | |
| 2006/0189822 A1 | 8/2006 | Yoon et al. | |
| 2006/0234576 A1 | 10/2006 | Smith et al. | |
| 2006/0252853 A1 | 11/2006 | Ajayan et al. | |
| 2006/0269670 A1 | 11/2006 | Lashmore et al. | |
| 2006/0272701 A1 | 12/2006 | Ajayan et al. | |
| 2007/0009421 A1 | 1/2007 | Kittrell et al. | |
| 2007/0029291 A1 | 2/2007 | Boulos et al. | |
| 2007/0031662 A1 | 2/2007 | Devaux et al. | |
| 2007/0036709 A1 | 2/2007 | Lashmore et al. | |
| 2007/0048211 A1 | 3/2007 | Jiang et al. | |
| 2007/0056855 A1 | 3/2007 | Lo et al. | |
| 2007/0087121 A1 | 4/2007 | Change et al. | |
| 2007/0092431 A1 | 4/2007 | Resasco et al. | |
| 2007/0104947 A1 | 5/2007 | Shambaugh | |
| 2007/0104993 A1 | 5/2007 | Lee et al. | |
| 2007/0116627 A1 | 5/2007 | Collier et al. | |
| 2007/0116631 A1 | 5/2007 | Li et al. | |
| 2007/0140947 A1 | 6/2007 | Schneider et al. | |

(56) References Cited

U.S. PATENT DOCUMENTS

| | | | |
|---|---|---|---|
| 2007/0151744 A1 | 7/2007 | Chen | |
| 2007/0166223 A1 | 7/2007 | Jiange et al. | |
| 2007/0202403 A1 | 8/2007 | Oh et al. | |
| 2007/0232699 A1 | 10/2007 | Russell et al. | |
| 2007/0236325 A1 | 10/2007 | Bertin et al. | |
| 2007/0237959 A1 | 10/2007 | Lemaire | |
| 2007/0277866 A1 | 12/2007 | Sander et al. | |
| 2007/0293086 A1 | 12/2007 | Liu et al. | |
| 2008/0001284 A1 | 1/2008 | Yuen et al. | |
| 2008/0026116 A1 | 1/2008 | Chisholm et al. | |
| 2008/0160865 A1* | 7/2008 | Wei | H01J 63/02 445/23 |
| 2008/0166563 A1 | 7/2008 | Brittingham et al. | |
| 2008/0170982 A1 | 7/2008 | Zhang et al. | |
| 2008/0238882 A1 | 10/2008 | Sivarajan et al. | |
| 2008/0261116 A1 | 10/2008 | Burton et al. | |
| 2008/0296683 A1 | 12/2008 | Yoon et al. | |
| 2009/0042455 A1 | 2/2009 | Mann et al. | |
| 2009/0044848 A1 | 2/2009 | Lashmore et al. | |
| 2009/0047513 A1 | 2/2009 | Lashmore | |
| 2009/0075545 A1 | 3/2009 | Lashmore et al. | |
| 2009/0101505 A1 | 4/2009 | Marino et al. | |
| 2009/0117025 A1 | 5/2009 | Lashmore et al. | |
| 2009/0127712 A1 | 5/2009 | Wyland | |
| 2009/0169819 A1 | 7/2009 | Drzaic et al. | |
| 2009/0194525 A1 | 8/2009 | Lee et al. | |
| 2009/0237886 A1 | 9/2009 | Iwai et al. | |
| 2009/0246408 A1 | 10/2009 | Chan et al. | |
| 2009/0266477 A1 | 10/2009 | Weisenberger | |
| 2009/0269511 A1 | 10/2009 | Zhamu et al. | |
| 2009/0277897 A1 | 11/2009 | Lashmore et al. | |
| 2009/0305135 A1 | 12/2009 | Shi et al. | |
| 2009/0311166 A1 | 12/2009 | Hart et al. | |
| 2009/0317710 A1 | 12/2009 | Douglas et al. | |
| 2010/0000754 A1 | 1/2010 | Mann et al. | |
| 2010/0021682 A1 | 1/2010 | Liang et al. | |
| 2010/0028639 A1 | 2/2010 | Liang et al. | |
| 2010/0041297 A1 | 2/2010 | Jiang et al. | |
| 2010/0044074 A1 | 2/2010 | Kim et al. | |
| 2010/0196249 A1 | 8/2010 | Hata et al. | |
| 2010/0219383 A1 | 9/2010 | Eklund | |
| 2010/0220074 A1 | 9/2010 | Irvin, Jr. et al. | |
| 2010/0243227 A1 | 9/2010 | Wu et al. | |
| 2010/0243295 A1 | 9/2010 | Allemand et al. | |
| 2010/0252184 A1 | 10/2010 | Morimoto et al. | |
| 2010/0261821 A1 | 10/2010 | Park et al. | |
| 2010/0270058 A1 | 10/2010 | Mahoney et al. | |
| 2010/0271253 A1 | 10/2010 | Shah et al. | |
| 2010/0272978 A1 | 10/2010 | Kumar et al. | |
| 2010/0296983 A1 | 11/2010 | Shiraki et al. | |
| 2010/0324656 A1 | 12/2010 | Lashmore et al. | |
| 2010/0328845 A1 | 12/2010 | Hiralal et al. | |
| 2011/0005808 A1 | 1/2011 | White et al. | |
| 2011/0007477 A1 | 1/2011 | Xu et al. | |
| 2011/0027491 A1 | 2/2011 | Rueckes et al. | |
| 2011/0110843 A1 | 5/2011 | Pasquali et al. | |
| 2011/0111279 A1 | 5/2011 | Smithyman et al. | |
| 2011/0127472 A1 | 6/2011 | Sato et al. | |
| 2011/0224113 A1 | 9/2011 | Pick et al. | |
| 2012/0041146 A1* | 2/2012 | Zhang | C08H 6/00 525/135 |
| 2012/0045385 A1 | 2/2012 | Lashmore et al. | |
| 2012/0118552 A1 | 5/2012 | White et al. | |
| 2012/0183770 A1 | 7/2012 | Bosnyak et al. | |
| 2014/0311921 A1 | 10/2014 | Howard et al. | |

FOREIGN PATENT DOCUMENTS

| | | |
|---|---|---|
| EP | 1160861 | 12/2001 |
| EP | 2365117 | 9/2011 |
| JP | 1958-072036 | 5/1983 |
| JP | 8035069 | 2/1996 |
| JP | H09509779 | 9/1997 |
| JP | 2000-058228 | 2/2000 |
| JP | 2002-515847 | 5/2002 |
| JP | 2003518330 | 6/2003 |
| JP | 2004253796 | 9/2004 |
| JP | 2004-315297 | 11/2004 |
| JP | 2004-339499 | 12/2004 |
| JP | 2004339499 A * | 12/2004 |
| JP | 2005-502792 | 1/2005 |
| JP | 2005-075672 | 3/2005 |
| JP | 2005-116839 | 4/2005 |
| JP | 2005-281672 | 10/2005 |
| JP | 2006-335604 | 12/2006 |
| JP | 2007-009213 | 1/2007 |
| JP | 2007-063552 | 3/2007 |
| JP | 2007-103375 | 4/2007 |
| JP | 2007-182352 | 7/2007 |
| JP | 2008055375 | 3/2008 |
| JP | 2008-523254 | 7/2008 |
| JP | 2008-297196 | 12/2008 |
| JP | 2009242145 | 10/2009 |
| JP | 2009252713 | 10/2009 |
| JP | 2011-508364 | 3/2011 |
| JP | 2011/508364 | 3/2011 |
| KR | 2005-0007886 | 1/2005 |
| WO | 98/39250 | 9/1998 |
| WO | 01/15710 | 3/2001 |
| WO | 02/055769 | 7/2002 |
| WO | 03/004741 | 1/2003 |
| WO | 03/080905 | 10/2003 |
| WO | 2006/025393 | 3/2006 |
| WO | 2006/052039 | 5/2006 |
| WO | 2006/069007 | 6/2006 |
| WO | 2006/073460 | 7/2006 |
| WO | 2006/099156 | 9/2006 |
| WO | 2006137893 | 12/2006 |
| WO | 2007/003879 | 1/2007 |
| WO | 2007/015710 | 2/2007 |
| WO | 2007/086909 | 8/2007 |
| WO | 2007/089118 | 8/2007 |
| WO | 2007086878 | 8/2007 |
| WO | 2008/002071 | 1/2008 |
| WO | 2008013508 | 1/2008 |
| WO | 2008/036068 | 3/2008 |
| WO | 2008/048286 | 4/2008 |
| WO | 2009/072478 | 6/2009 |
| WO | 2009/137722 | 11/2009 |
| WO | 2009/137725 | 11/2009 |
| WO | 2009-155267 | 12/2009 |
| WO | 2011/005964 | 1/2011 |
| WO | 2011/163129 | 12/2011 |

OTHER PUBLICATIONS

Biro, et al., "Direct Synthesis of Multi-Walled and Single Walled Carbon Nanotubes by Spray-Pyrolysis", J. Optoelectronics and Advanced Materials, Sep. 2003; vol. 5, No. 3, pp. 661-666.

Ci et al., "Carbon nanofibers and single-walled nanotubes prepared by the floating catalyst method" Carbon. 39:329-335.

D.S. Bethune et al., "Cobalt-catalyzed growth of carbon nanotubes with single-atomic-layer walls", Letters to Nature, 363: 605-607 (1993).

E.F. Kukovitsky et al., "CVD growth of carbon nanotube films on nickel substrates", Applied Surface Science, 215:201-208 (2003).

Gou, J.G., "Passage: Nanotube Bucky Papers and Nanocomposites", Ph.D. Disseration, Marburg An Der Lahn, pp. 93-126, Jan. 1, 2002.

Gou, J.G., "Single-Walled Carbon Nanotube Bucky Paper/Epoxy Composites: Molecular Dynamics Simulation and Process Development", Ph.D. Dissertation, The Florida State University, 2002, p. 9-126.

Gun-Do Lee et al, "Catalytic decomposition of acetylene on Fe (001): A first-principles study", The American Physical Society, Physical Review B66 081403R: 1-4 (2002).

H.W. Kroto et al., "C60: Buckminsterfullerene", Letters to Nature, 318:162-163, (1985).

H.W. Zhu et al., "Direct Synthesis of Long Single-Walled Carbon Nanotube Strands", Science, 296:884-886 (2002).

(56) References Cited

OTHER PUBLICATIONS

Hanson, G. W., "Fundamental Transmitting Properties of Carbon Nanotube Antennas", IEEE Transactions on Antennas and Propgation, vol. 53, No. 11, pp. 3246-3435, Nov. 2005.
Jiang et al., "Spinning Continuous Carbon Nanotube Yarns", Nature, Oct. 24, 2002, vol. 419, p. 801.
Kaili et al., "Spinning Continuous Carbon Nanotube Yarns", Nature, Oct. 24, 2002, vol. 419, p. 801.
Ki-Hong Lee et al., "Control of Growth Orientation for Carbon Nanotubes", Applied Physics Letters, 82(3):448-450, (2003).
Ko et al., "Electrospinning of Continuous Carbon Nanotube-Filled Nanofiber Yarns," Advanced Materials. 15 (14): 1161-1165.
Li et al., "Direct Spinning of Carbon Nanotube Fibers from Chemical Vapor Deposition Synthesis", Science Magazine, 2004, vol. 304, pp. 276-278.
M. Jose-Yacaman et al., "Catalytic growth of carbon microtubules with fullerene structure", Applied Physics Letters, 62 (6): 657-659 (1993).
Vigolo et al., "Improved structure and properties of single-wall carbon nanotube spun fibers", Applied Physics Letters, American Institute of Physics, US, vol. 81, No. 7, Aug. 12, 2002 (Aug. 12, 2002), pp. 1210-1212, XP012033229.
Moisala et al., "Single-walled carbon nanotube synthesis using ferrocene and iron pentacarbonyl in a laminar flow reactor," Chemical Engineering Science, 61(13), pp. 4393-4402 (Jul. 2006).
N. Seo Kim et al., "Dependence of the Vertically Aligned Growth of Carbon Nanotubes on the Catalysts", The Journal of Physical Chemistry, 106 (36): 9286-9290 (2002).
Ng, Single Walled Carbon Nanotube Paper as anode for lithium-ion battery; Elsevier, Elechtrochimica Acta 51 (2005) 23-28.
Okabe, T. et al., "New Porous Carbon Materials, Woodceramics: Development and Fundamental Properties", Journal of Porous Materials, vol. 2, pp. 207-213, 1996.
Pipes et al., "Helical carbon nanotube arrays: mechanical properties," Composites Science and Technology. 62: 419-428 (2002).
R.T.K. Baker et al., "Nucleation and Growth of Carbon Deposits from the Nickel Catalyzed Decomposition of Acetylene", Journal of Catalysis, 26:51-62 (1972).
Schaevitz et al., "A Combustion-Based Mems Thermoelectric Power Generator", The 11th Conference on Solid-State Sensors and Actuators, Munich, Germany, Jun. 10-14, 2001.
Seo et al., "Synthesis and manipulation of carbon nanotubes," New Journal of Phsics. 5: 120.1-120.22 (2003).
Seung-Yup Lee et al., "Synthesis of Carbon Nanotubes Over Gold Nanoparticle Supported Catalysts", Carbon, 43 (2005), pp. 2654-2663.
Sumio Iijima, "Helical microtubules of graphitic carbon", Letters to Nature, 354:56-58 (1991).
Surfynol, Dynol, and Envirogem Reference Guide. AirProducts, 2006 {retrieved fro mthe Internet: <URL: www.airproducts.com/microsite/perfmat/pdf/ZetaSperseAdditives.pdf>.
Tapaszto et al., Diameter and Morphology Dependence on Experimental Conditions of Carbon Nanotube Arrays Grown by Spray Pyrolysis, Carbon, Jan. 2005; vol. 43, pp. 970-977.
Wang, "Processing and property investigation of single walled carbon nanotube (SWNT) buckypaper/epoxy resin matrix nanocomposites," Composites. 35(10): 1225-1232 (2004).
Xiao et al., "High-Mobility Thin-Film Transitors Based on Aligned Carbon Nanotubes", Applied Physics Letters, vol. 83, No. 1, pp. 150-152, Jul. 7, 2003.
International Search Report in International Application No. PCT/US2014/032827 mailed Aug. 22, 2014.
Braden et al., "Method to synthesis high 1-23 volume fraction CNT composites by micro-alignment of carbon nanotubes through chemically assisted mechanical stretching", International Sampe Symposium and Exhibition (Proceedings), Material and Process Innovations: Change our World 2008 Soc. for the Advancement of Material and Process Engineering. International Business Office US, vol. 52, 2008, XP009183898.
NETAFIM(TM) Mesh vs. Micron Comparison Chart.
Hansen, C., "Hansen Solubility Parameters", CRC Press, 2007.
Yu et al., "Controlling the dispersion of multi-wall carbon nanotubes in aqueous surfactant solution", CARBON, vol. 45, No. 3, pp. 618-623, Jan. 26, 2007.
Extended European Search Report issued in European Application No. 14812969.5 mailed Jan. 2, 2017.

\* cited by examiner

EXFOLIATING-DISPERSING AGENTS FOR NANOTUBES, BUNDLES AND FIBERS

RELATED APPLICATION

This application claims priority to U.S. Provisional Application Ser. No. 61/835,994, filed Jun. 17, 2013, the disclosure of which is hereby incorporated herein by reference in its entirety.

TECHNICAL FIELD

The present invention relates to the formation of dispersions of nanotubes. In particular, the present invention relates to the exfoliation and dispersion of carbon nanotubes resulting in surface-modified carbon nanotubes that are readily dispersed in various media.

BACKGROUND ART

Nanotubes may be fabricated using a variety of approaches. For example, nanotubes can be produced by conducting chemical vapor deposition (CVD) in such a manner that the nanotubes can be caused to deposit either on a moving belt or cylinder, where the nanotubes consolidate so as to form a non-woven sheet. Alternatively, the nanotubes can be taken up by a spinning device and spun into a yarn. Nanotubes collected as yarns, non-woven sheets, or similar extensible structures can also be fabricated by other means. For instance, the nanotubes can be dispersed in a water surfactant solution, then caused to precipitate onto a filter drum or membrane, where they can be subsequently be dried and removed as a sort of paper. Similarly, nanotubes collected as yarns can also be produced from solutions, and is well know in the art. In general, the nanotubes produced within these extensible structures can be either single-walled (SWNT) or multi-walled (MWNT), and may be made from, for example, carbon, boron, or a combination thereof.

Carbon nanotubes in their solid state are generally produced as agglomerated nanotube bundles. Various methods have been developed to debundle or disentangle carbon nanotubes in solution. For example, carbon nanotubes may be sonicated in presence of a surfactant such as sodium dodecyl sulfate or Triton-X series of polymeric surfactant to be dispersed in a dilute solution that is not adequate for commercial usage. The resulting carbon nanotube dispersion usually contains surfactant or dispersal aid residues that are not removable. Other methods involve the shortening of the carbon nanotubes prior to dispersing the individual nanotubes in dilute solution. Such dilute solution contain a concentration of nanotubes that is generally not adequate for commercial usage Accordingly, it would be desirable to provide compositions and a process capable of separating nanotubes from their higher morphology order into smaller entities that can be used in carbon nanotubes containing materials.

SUMMARY OF THE INVENTION

The present invention provides, in one embodiment, a method for preparing a dispersion of carbon nanotubes. In some embodiments, the method comprises a) suspending entangled non-discrete carbon nanotubes in a solution comprising an aromatic hydrocarbon molecule and a molecule having an electron donor group, b) optionally agitating the composition, and c) isolating the carbon nanotubes from the composition.

In some embodiments, in the step of suspending the aromatic hydrocarbon comprises a benzyl group, biphenyl group, an anthracenic group, polyaromatic group, or combinations thereof. In some embodiments, in the step of suspending the electron donor group comprises oxygen groups, hydroxyl group, thiol group, group, ketone group, amines group, ester group or combinations thereof.

In some embodiments, the isolation step is by solid/liquid separation, for example filtration, centrifugation or a combination thereof.

In some embodiments, in the step of isolating the carbon nanotubes are exfoliated carbon nanotubes. In some embodiments, in the step of isolating the carbon nanotubes are in the form of individual nanotubes, nanotube bundles or nanotube fibers.

In some embodiments, the method further comprises reassembling the nanotubes in higher hierarchical morphologies.

Aspects of the invention relate to a composition comprising carbon nanotubes, wherein the carbon nanotubes are dispersed in a solution and wherein the carbon nanotubes have a length greater than of about 100 micrometers.

In some embodiments, the carbon nanotubes comprise exfoliated carbon nanotubes. In some embodiments, the carbon nanotubes comprise isolated carbon nanotubes.

In some embodiments, the solution comprises an aromatic hydrocarbon molecule and a molecule having an electron donor group. In some embodiments, the aromatic hydrocarbon comprises a benzyl group, biphenyl group, an anthracenic group, a polyaromatic group or combinations thereof. In some embodiments, the electron donor group comprises oxygen groups, hydroxyl group, thiol group, group, ketone group, amines group, ester group or combinations thereof.

Aspects of the invention relate to the use of the composition in a powder or liquid mixture for use in in paints, inks, plastics, composites, particulates, coatings, fibers or the like. Other aspects of the invention relate to the use of the composition in a powder or liquid mixture for use the formation of nanotube sheets, nanotube yarn, or nanotube bundles.

DESCRIPTION OF SPECIFIC EMBODIMENTS

Figure 1A:
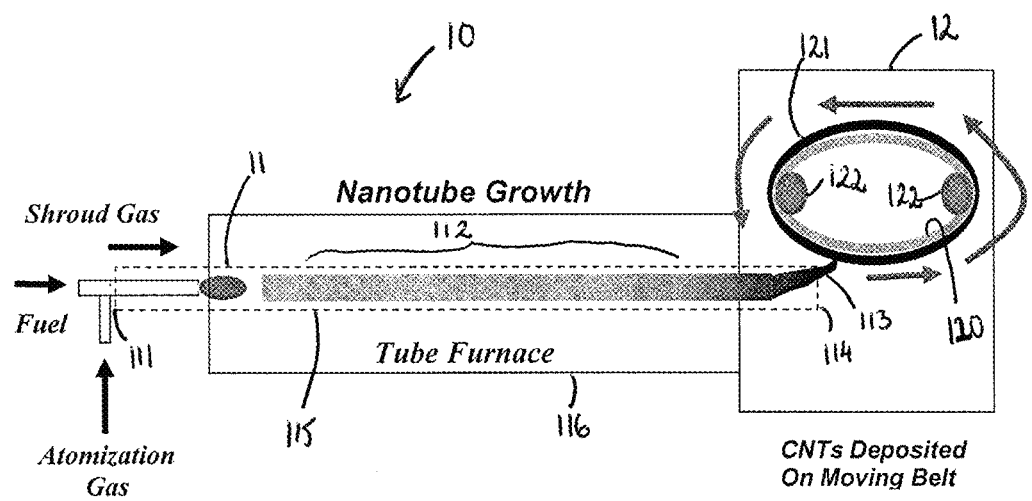
FIG. 1A illustrates a system for generating nanotubes and collecting the nanotubes as a non-woven sheet.

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Any of the embodiments herein referencing carbon nanotubes may also be modified within the spirit and scope of the disclosure to substitute other tubular nanostructures, including, for example, inorganic or mineral nanotubes. Inorganic or mineral nanotubes include, for example, silicon nanotubes, boron nitride nanotubes and carbon nanotubes having heteroatom substitution in the nanotube structure Nanotubes for use in connection with the present invention may be fabricated using a variety of approaches. Presently, there exist multiple processes and variations thereof for growing nanotubes. These include: (1) Chemical Vapor Deposition (CVD), a common process that can occur at near ambient or at high pressures, and at temperatures above about 400° C., (2) Arc Discharge, a high temperature process that can give rise to tubes having a high degree of perfection, and (3) Laser ablation. It should be noted that although reference is made below to nanotube synthesized from carbon, other compound(s) may be used in connection with the synthesis of nanotubes for use with the present invention. Other methods, such as plasma CVD or the like are also possible. In addition, it is understood that boron nanotubes may also be grown in a similar environment, but with different chemical precursors.

The carbon nanotubes made can be present in a variety of forms including, for example, sheet, yarn, soot, powder, fibers, and bucky paper. Furthermore, the bundled carbon nanotubes may be of any length, diameter, or chirality. Yet in some embodiments, the CNTs can have a length greater than 100 micrometers.

Carbon nanotubes (CNTs) are currently made in hierarchical morphologies of increasing complexity. In the theory of formation of CNTs, individual nanotubes are initially formed, which then combined into bundles of tubes. The bundles may then assemble into fibers to start to form a two and/or three dimensional structure. The general structures formed are, but not limited to, CNT sheets, yarns, and powders (e.g. bundles, fibers, or other entities). While these forms may be useful for many applications, there are some applications where the material may lack the proper morphology. Some of those applications include, but are not limited to paints, inks, coatings, dispersions, plastics, composites and particulates.

In these forms it may be advantageous for CNTs to have particulate and/or fibrous form. Further, the new forms may also differ in particulate size and distribution, depending on the application.

According to some aspects of the invention, CNTs are made in some hierarchical morphologies (e.g. sheet), and transform the CNTs into another form (e.g., particulate and/or fiber) using chemical means, physical means or combination of chemical and physical means.

To date chemical means used to separate CNTs from their "as-made" morphologies into dispersible particles have had limited or no success. For example, surfactants and/or dispersing agents (e.g. aromatic non-ionic surfactants) have been added to CNTs in water or organic solvents and then physically dispersed with a shear mixer or an ultrasonic horn. Such process has several disadvantages such as the production of very low and impractical concentrations of CNT dispersions. In addition, the surfactants can adsorb onto the CNTs and may interfere with or contaminate the latter in applications.

Superacids, like chlorosulfonic acid, as well as alkali metals have also been used to disperse CNTs, but are very reactive to other chemicals (e.g., water), require highly specialized operating conditions, may leave a residue or chemically modify the CNTs, and are incompatible with other components when the processed material is combined in a product formulation, for example inkjet printing.

General organic solvents such as aliphatic hydrocarbons, aromatics, and olefins often produce no separation at all. Thus, the means to disperse or transform CNTs (i.e., dispersant and super acids, both with physical agitation) are limited in resulting concentration and end products.

Using the methods known in the art, considerable amount of energy is generally employed and limited dispersion as well as limited communition is achieved.

Furthermore, regulation of the new product form using theses processes, particulate or fiber size and size distribution, can be very limited and uncontrolled.

Aspects of the present invention relate to a new class of chemical compounds, capable of separating CNTs initial from their higher order morphology into much smaller entities, bundles or even individual tubes. In some embodiments, the chemicals may be used with mild physical agitation to help dissociating the CNTs.

According to some aspects of the invention, the chemical compounds used in the present invention have several advantages including, but not limited to ease of removal from the CNTs after dispersion, availability on commercial scale, capability to be processed straightforwardly, and do not introduce incompatibilities with other components in a product formulation. In addition, the methods of the present invention allow for the production of exfoliated CNTs in high yield.

CVD Process:

The present invention, in one embodiment, employs a CVD process or similar gas phase pyrolysis procedures known in the industry to generate the appropriate nanostructures, including nanotubes. In particular, since growth temperatures for CVD can be comparatively low ranging, for instance, from about 400° C. to about 1300° C., carbon nanotubes, both single wall (SWNT) or multiwall (MWNT), may be grown, in an embodiment, from nanostructural catalyst particles introduced into reagent carbon-containing gases (i.e., gaseous carbon source), either by addition of existing particles or by in situ synthesis of the particles from a metal-organic precursor, or even non-metallic catalysts. Although both SWNT and MWNT may be grown, in certain instances, SWNT may be preferred due to their relatively higher growth rate and tendency to form ropes, which may offer advantages in handling, safety, and strength.

Moreover, the strength of the individual SWNT and MWNT generated for use in connection with the present invention may be about 30 GPa or more. Strength, as should be noted, is sensitive to defects. However, the elastic modulus of the SWNT and MWNT fabricated for use with the present invention is typically not sensitive to defects and can vary from about 1 to about 1.2 TPa. Moreover, the strain to failure, which generally can be a structure sensitive parameter, may range from a few percent to a maximum of about 12% in the present invention.

Furthermore, the nanotubes of the present invention can be provided with relatively small diameter, so that relatively high capacitance can be generated. In an embodiment of the present invention, the nanotubes of the present invention can be provided with a diameter in a range of from less than 1 nm to about 10 nm. It should be appreciated that the smaller the diameter of the nanotubes, the higher the surface area per gram of nanotubes can be provided, and thus the higher the capacitance that can be generated. For example, assuming a 50 micron Farads per cm capacitance for graphene and a density of about 1.5 g/cc for the SWNT, capacitance can be calculated using the following formula:

$$\text{Capacitance (Farads/gram)} = 1333/d \text{ (nm)}$$

Therefore, assuming a uniform textile of 1 nm diameter tubes with no shielding, then a specific capacitance of 1333 Farads per gram should be feasible, neglecting the loss in surface area when ropes are formed and neglecting the loss of active area for the nanotubes that may be shielded by neighboring nanotubes.

With reference now to FIG. 1A, there is illustrated a system 10, similar to that disclosed in U.S. Pat. No. 7,993,620, incorporated herein by reference, for use in the fabrication of nanotubes. System 10, in an embodiment, may be coupled to a synthesis chamber 11. The synthesis chamber 11, in general, includes an entrance end 111, into which reaction gases may be supplied, a hot zone 112, where synthesis of extended length nanotubes 113 may occur, and an exit end 114 from which the products of the reaction, namely the nanotubes and exhaust gases, may exit and be collected. The nanotubes generated, in an embodiment, may be individual nanotubes, bundles of nanotubes and/or intertwined nanotubes (e.g., ropes of nanotubes). In addition, synthesis chamber 11 may include, in an embodiment, a quartz tube 115 extending through a furnace 116.

System 10, in one embodiment of the present invention, may also includes a housing 12 designed to be substantially airtight, so as to minimize the release of potentially hazardous airborne particulates from within the synthesis chamber 11 into the environment. The housing 12 may also act to prevent oxygen from entering into the system 10 and reaching the synthesis chamber 11. In particular, the presence of oxygen within the synthesis chamber 11 can affect the integrity and compromise the production of the nanotubes 113.

Figure 1B:
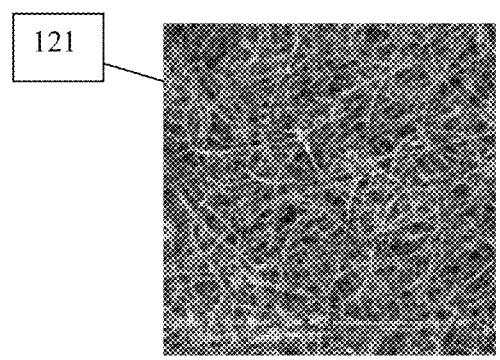
FIG. 1B illustrates a portion of a non-woven sheet prior to being stretched with the nanotubes intermingled and substantially in non-alignment relative to one another.
Figure 2A:
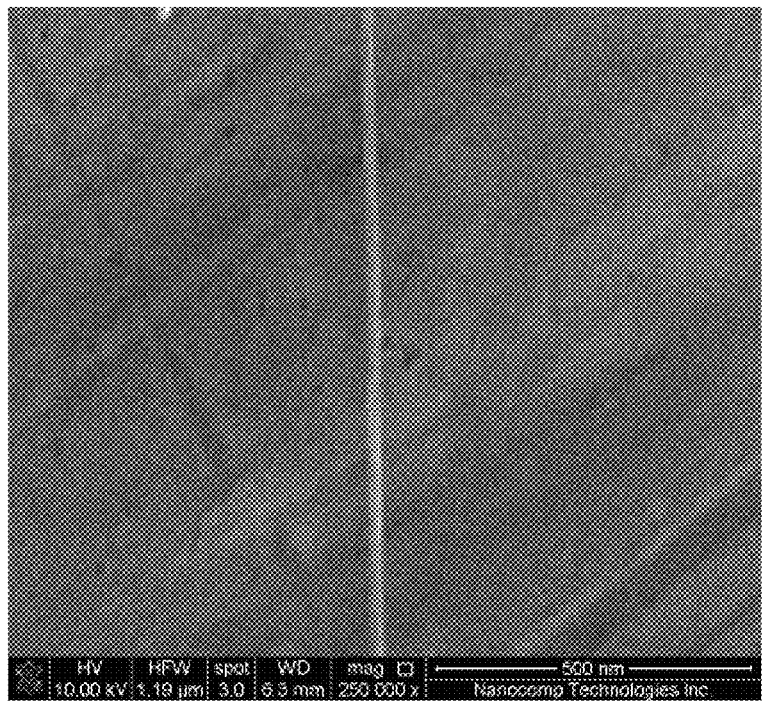
FIG. 2A, FIG. 2B and FIG. 2C are SEM images of a single MWNT that was obtained from a CNT sheet material by processing the material in methyl anthranilate. The SEM images show a single tube isolated according to one embodiment of the invention.
Figure 2B:
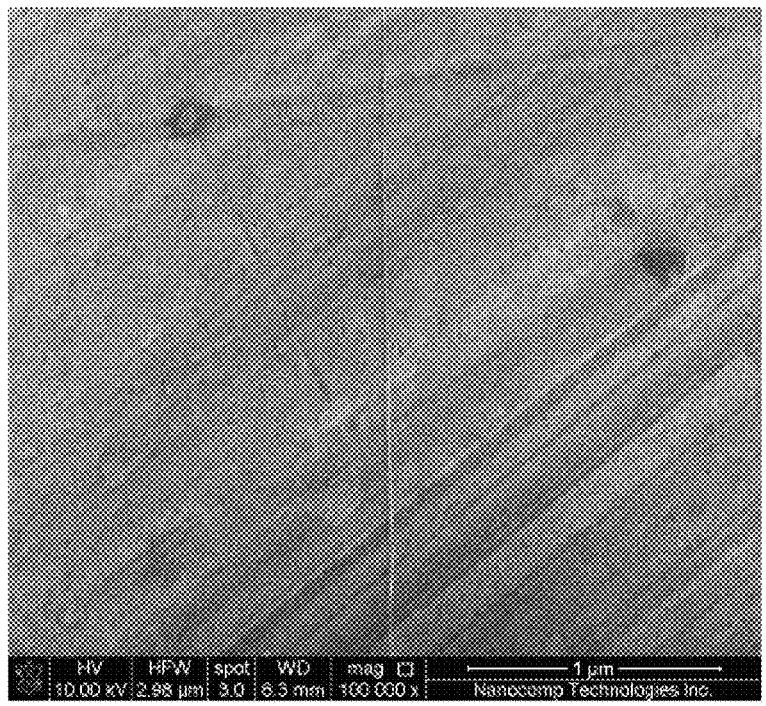
Figure 2C:
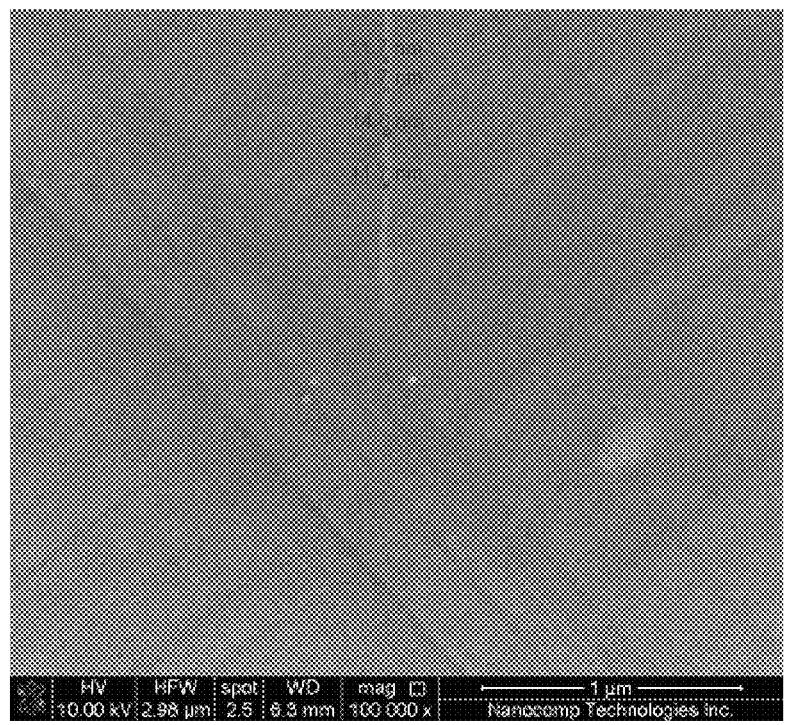
Figure 3:
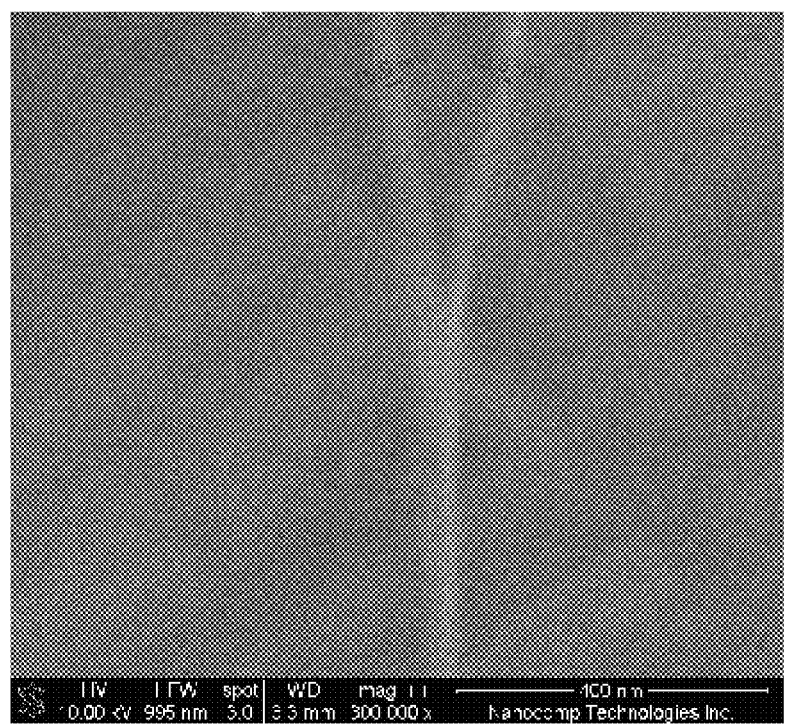
FIG. 3 is a SEM image of the material formed according to one embodiment of the invention with a Y-junction between two tubes.

System 10 may also include a moving belt 120, positioned within housing 12, designed for collecting synthesized nanotubes 113 made from a CVD process within synthesis chamber 11 of system 10. In particular, belt 120 may be used to permit nanotubes collected thereon to subsequently form a substantially continuous extensible structure 121, for instance, a non-woven sheet, as illustrated in FIG. 1B, or a yarn of twisted and intertwined nanotubes. Such a non-woven sheet may be generated from compacted, substantially non-aligned, and intermingled nanotubes 113, bundles of nanotubes, or intertwined nanotubes (e.g., ropes of nanotubes), with sufficient structural integrity to be handled as a sheet.

To collect the fabricated nanotubes 113, belt 120 may be positioned adjacent the exit end 114 of the synthesis chamber 11 to permit the nanotubes to be deposited on to belt 120. In one embodiment, belt 120 may be positioned substantially parallel to the flow of gas from the exit end 114, as illustrated in FIG. 1A. Alternatively, belt 120 may be positioned substantially perpendicular to the flow of gas from the exit end 114 and may be porous in nature to allow the flow of gas carrying the nanomaterials to pass therethrough. Belt 120 may be designed as a continuous loop, similar to a conventional conveyor belt. To that end, belt 120, in an embodiment, may be looped about opposing rotating elements 122 (e.g., rollers) and may be driven by a mechanical device, such as an electric motor. In one embodiment, the motor may be controlled through the use of a control system, such as a computer or microprocessor, so that tension and velocity can be optimized.

Although not shown, it should be appreciated that the nanotubes generated by system 10 may also be collected as a yarn, as provided below in Example II. Such an approach is disclosed in U.S. Pat. No. 7,993,620, which is hereby incorporated herein by reference.

Chemical Treatment

Carbon nanotubes have certain shared chemistries and chemical properties with other carbonaceous materials such as polymers and other organic systems. For example, CNTs are comprised of repeating aromatic groups of carbon in the physical form of tubes (See W. Linert and I. Lukovits J. Chem. Inf. Model., 2007, 47 (3), pp 887-890). CNTs may be any of the various forms including single-walled (SWCNT), multi-walled (MWCNT), or other types of CNTs.

Dispersing carbon nanotubes in a liquid can be difficult because of the entanglement of nanotubes into large agglomerates. Aspects of the invention relate to chemical compositions and processes to separate CNTs from a higher order morphology ("as made" form) into much smaller entities, bundles or even individual discrete nanotubes. In some embodiments, the chemical composition comprises exfoliating/dispersing agents. In some embodiments, the process uses a combination of chemicals under optionally mild mechanical agitation. Examples of mechanical agitation methods that may be used include without limitation shaking, stirring, and/or other mechanical means.

As used herein, the terms "disperse", "de-rope" or "de-bundle" refer to the substantial separation or disentanglement of individual nanotubes from a bundle, rope, aggregate, clump, intertwined, or similar conformation compromising one or more nanotubes in association with each other. As used herein, "exfoliated" refers to partially dispersed, individually dispersed, or monodisperse nanomaterials, having been stripped from a bundle, rope, or aggregate of similar nanomaterials. As used herein, "exfoliation" refers to a the process wherein carbon nanotube agglomerates, bundles, ropes, or aggregates primarily held together by van der Waals forces, are disengaged or dispersed from each other. In some embodiments, the specific chemical compounds are capable of separating and dispersing carbon nanotubes having a length greater than 100 micrometers.

In accordance with some embodiments of the present invention, specific chemical compounds, or combinations thereof, can preferentially adsorb to CNTs and with mild agitation can separate and disperse CNTs to smaller entities.

CNTs have repeating aromatic surface groups that are electron deficient. The specific chemical compounds capable of adsorbing and assisting in CNT separation can be comprised of two general groups described herein.

In accordance with some embodiments of the present invention, the first group comprises an aromatic species. Aromatic species can comprise aromatic hydrocarbon (e.g. benzene ring, phenyl ring), polycyclic aromatic hydrocarbons. For example, chemical compounds of the first groups include, but are not limited to, benzyl, biphenyl and anthracenic groups and combination thereof. Anthracene is a solid polycyclic aromatic hydrocarbon consisting of three fused benzene rings.

Without being bound to the theory, it is thought that the aromatic species associate with the aromatic repeating groups of the CNTs. However, one of skill in the art will understand that by itself, an aromatic group will not disperse CNTs. For example, it is known that benzene does not disperse CNTs.

In accordance with some embodiments of the present invention, the second, group can include one or more groups that are comprised of Electron Donating Groups (EDGs) and bonded to group one. In this manner, the first and second groups can associate with the CNTs and can donate electrons to the electron deficient CNTs, thus resulting in the separation of the CNTs.

Examples of EDGs are shown in Table 1.

TABLE 1

Activating groups for aromatic molecules including electron donating groups (EDGs) and electron withdrawing groups (EWGs)

Electron Activating and Deactivating Groups

| Election Donating Groups | | | Election Withdrawing Groups |
|---|---|---|---|
| —Ö: <br> —N̈R$_2$ <br> —N̈H$_2$ <br> —ÖH <br> —ÖR | Strong Activating | —X ] Weak Deactivating <br> —NR$_2$ | |
| O<br>‖<br>—N̈HCR <br> O<br>‖<br>—ÖCR | Moderate Activating | O<br>‖<br>—CH <br> O<br>‖<br>—CR <br> O<br>‖<br>—COR <br> O<br>‖<br>—COH <br> O<br>‖<br>—CCl | Moderate Deactivating |
| —R <br> —⌬— <br> —C$\underset{H}{}$=CR$_2$ | Weak Activating | | |
| —H Reference | | | |

Electron Donating Groups (EDGs)

EDGs have lone pairs of electrons on atom adjacent to pi system-except —R, —Ar, vinyl or hyper-conjugated systems. EDGs typically have ortho or para directed groups. EDGs contribute electrons to pi-system making it more electrophilic.

Electron Withdrawing Groups (EWGs)

EWGs have atom next to pi system bonds to more electronegative atoms OR has positive charge. EWGs have deactivating groups meta-directing, except halogens which direct ortho and para. EWGs remove electron density from pi system making it less nucleophilic. R is typically a hydrocarbon group.

In some embodiments, the subset of activating groups, which are net electron density donating species, include, but are not limited to, phenolate, substituted amine, amine, phenol, alkoxy, amide (nitrogen bonded), ester (oxygen bonded), phenyl, and alkyl.

The EDGs vary in strength of electron donation. For comparison, aromatic groups could have all pendant bounds to carbon atoms be comprised of hydrogen atoms, which are considered neither net electron donating (i.e. activating), nor withdrawing (deactivating). For example, electron withdrawing (deactivating) groups include, but are not limited to, halogens, formyl groups, ketones, esters (carbon bonded), carboxylic acids, acyl chlorides, trifluoromethyl, nitrile, sulfonate, ammonium, substituted ammonium, and nitro.

In some embodiments, the second group two may be comprised of EDGs including, but not limited to, oxygen groups, hydroxyl (—OH), thiols (R—SH), sulfoxide (R—S(=O)—R', where R and R' are organic groups), ketone (RC(=O)R'), amines (RNR'R''), attached ester groups (RCOOR') and the like and combinations thereof.

The molecule comprised of the first group and the second group molecules can have a structure that both strongly adsorbs onto the nanotube surface and supplies a repulsive force that results in the CNTs separating from their aggregated state. Carbonyl groups on the dispersing chemical compounds also appear to improve dispersion quality, and are thought to be involved in adsorption to the surface of the CNTs. These conditions have not been discovered in the past decade or more since CNTs were discovered.

The chemical mixture or solution used for dispersing the carbon nanotubes of the present invention can include, in an embodiment, a mixture of molecule having an aromatic hydrocarbon species and a molecule having an electron donating group listed in Table 1, in any various combination.

A small number of polymers have been investigated which possess some structural similarities, which are known to disperse CNTs, though these are of less utility compared with small molecules.

In accordance to some embodiments of the present invention, mild dispersion forces, such as a mixing, stirring, and sonication further assist in exposing more CNT sites to the specific chemical compounds and exfoliating the CNTs, resulting in smaller entities and different physical forms of CNTs.

Carbon nanotubes exfoliated/dispersed by the dispersing chemicals of the present invention results in a noncovalent complex of the carbon nanotubes and dispersing chemicals in solution. Exfoliated and dispersed carbon nanotubes can be subsequently removed from the dispersion or solution by removing the solution and made into a solid (solid exfoliated carbon nanotubes). Carbon nanotubes can then be re-dispersed or re-solubilized or further processed.

Dispersed Nanotube Applications:

The resuspended CNTs are suitable for applications in composites, metals, liquids, or other applications known to a skilled artisan. In non-limiting examples, the isolated nanotubes may be incorporated in a matrix such as liquids, oils, inks, polymers, epoxies, resins, waxes, alloys, or combinations thereof. Without limitation by theory, the dispersed, exfoliated, nanotubes may be directly mixed into any matrix or suspension.

In certain applications, the dispersed or re-suspended nanotubes may be deposited on a surface or substrate. In embodiments, the dispersed nanotubes may be used on a substrate to form a thin film. In certain embodiments, the nanotubes are deposited on a substrate as an ink. In alternate instances, the nanotubes are deposited on the substrate as a coating.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the claims appended hereto.

EXAMPLES

Example 1

In some embodiments, exfoliating agents such as cyclohexanone and vanillin (4-Hydroxy-3-methoxybenzaldehyde) were used on CNT sheet material synthesized as provided above and as disclosed in U.S. patent application Ser. No. 11/488,387. The selection of this combination was based on the Hansen solubility parameters for both substances (see Charles M. Hansen, Hansen Solubility Parameters: A User's Handbook (CRC Press: Boca Raton, Fla., 2007)). Gram quantities of sheet material were reduced to pulp in a few seconds by stirring with an electric kitchen mixer in volumes of a few hundred milliliters of solution.

In some embodiments, pure ethyl benzoate, methyl salicylate, and methyl anthranilate were used as exfoliating agents based on similarities of their molecular structures to the molecular structure of vanillin. Similar reductions to pulp were observed.

In some embodiments, samples were then centrifuged to remove the excess of solvent.

In order to increase the shearing force on the fibers, centrifuged samples of methyl anthranilate-processed pulp were placed in Epon™ resin 862 (Diglycidyl Ether of Bisphenol F) and Beckosol® 12-054 (short oil TOFA alkyd) and mixed again. Optical microscope images of the new mixtures show fiber bundles with lengths in the micron to mm range. SEM images of the methyl anthraniliate-processed pulp show exfoliation down to the single CNT level.

Example 2

The influence of phenolic moiety on the efficacy of aqueous vanillin in dispersing CNTs was investigated. It was found that by adjusting the pH above the pKa of vanillin, that dispersion quality was dramatically improved. Subsequently, by adjusting the pH well below the pKa of vanillin (i.e. below 7.781), the dispersion quality was dramatically reduced. pH was adjusted using for example potassium hydroxide or hydrochloric acid. This argues strongly in favor of the power of electronic effects of substituents on the aromatic ring. Non-woven articles were prepared from this dispersion, and these articled were found to have desirable values of sheet resistance.

Example 3

Further efforts were made to prepare non-woven textiles from dispersions of CNTs in Methyl Salicylate with similar results of desirable sheet resistance values.

Example 4

Ethyl benzoate was the most benign chemical and was used along with other benzyl direct esters.
Chemicals used were:
poly(ethylene glycol) dibenzoate
di {propylene glycol) dibenzoate
methyl benzoate
butyl benzoate
ethyl benzoate The chemicals were mixed with CNT sheet material and stirred using a metal spatula and then a beaker of CNT and plasticizer was mixed with a magnetic stir bar, resulting in dispersed CNTs.

Example 5

Procedures for a Qualitative Classification and for Removal of the Chemical Solvents Chemicals used were:
methyl salicylate
methyl anthranilate
ethyl benzoate
Vanillin
Saccharin in a KOH solution (pH 9)

The method consisted of adding CNT sheet material to the chemicals and applying a food processor for ~1-2 minutes to disperse CNTs.

Example 6

A dual-nature of chemicals (having one molecule from the first group and a second molecule from the second group) needed to interact to break down CNTs material was produced.

Example 7

The cyclohexanone and vanillin experiments were done at room temperature. Cyclohexanone is a liquid at room temperature and vanillin is a solid. Vanillin was added to the cyclohexanone and completely dissolved. Different solutions were made by varying the amount of vanillin added from approximately 0% (the control solution) up to 20% by mass. The vanillin typically took a few minutes to completely dissolve with gentle agitation. CNT sheet material was added at ratios from 0.5% by mass up to 5% by mass in order to determine optimal conditions for exfoliation. The material was placed in the solution, allowed to become soaked with the solution, and then blended using a blade mixer. Mixing typically took less than one minute. The resulting mass was a pulp which was very pliant and easily pulled apart mechanically and by hand into smaller and smaller fibers.

All publications, patent applications and patents mentioned herein are hereby incorporated by reference in their entirety as if each individual publication or patent was specifically and individually indicated to be incorporated by reference.

What is claimed is:

1. A composition comprising carbon nanotubes, wherein the carbon nanotubes are dispersed in a solution comprising poly(ethylene glycol) dibenzoate or di(propylene glycol) dibenzoate, and wherein the carbon nanotubes have a length greater than 100 micrometers.

2. The use of the composition of claim 1 in a powder or liquid mixture for use in paints, inks, plastics, composites, particulates, coatings, fibers or the like.

3. The use of the composition of claim 1 in a powder or liquid mixture for use in the formation of nanotube sheets, nanotube yarn, or nanotube bundles.

4. The composition of claim 1 wherein the carbon nanotubes comprise exfoliated carbon nanotubes.

5. The composition of claim 1, wherein the carbon nanotubes comprise individual discrete carbon nanotubes.

6. A composition, the composition comprising poly(ethylene glycol) dibenzoate or di(propylene glycol) dibenzoate, and carbon nanotubes having a length greater than 100 micrometers.

7. The composition of claim 6, wherein the carbon nanotubes comprise exfoliated carbon nanotubes.

8. The composition of claim 6, wherein the carbon nanotubes comprise individual discrete carbon nanotubes.

* * * * *